Patented Feb. 25, 1947

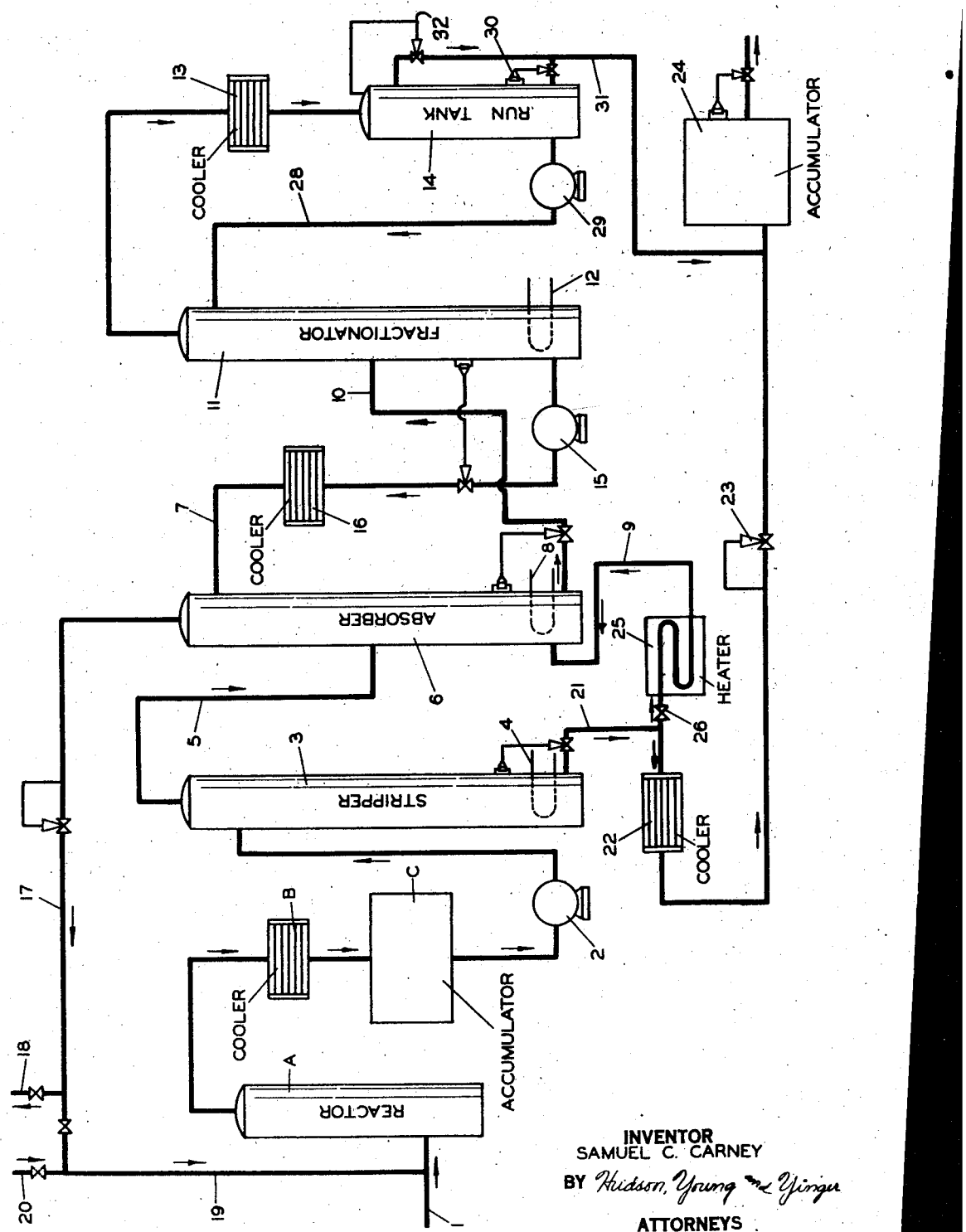

2,416,467

UNITED STATES PATENT OFFICE 2,416,467

RECOVERY OF HYDROGEN CHLORIDE FROM ADMIXTURE WITH PROPANE AND BUTANES

Samuel C. Carney, Bartlesville, Okla., assignor to Phillips Petroleum Company, a corporation of Delaware Application October 5, 1942, Serial No. 460,864

5 Claims. (Cl. 260—683.5)

The present invention relates to the recovery of hydrogen halides from admixture with volatile hydrocarbons. More particularly, the invention relates to the separation of hydrogen halide, particularly hydrogen chloride, from the effluents of a hydrocarbon conversion process, such as alkylation or isomerization processes. The present invention is particularly applicable to the separation of anhydrous hydrogen chloride from the effluent of a butane isomerization step in which butane is isomerized to isobutane in the presence of hydrogen chloride over an aluminum chloride catalyst.

Separations of the hydrogen halides and hydrocarbons have been made heretofore by rectification of the mixture or by selective absorption of the hydrogen halide. In many cases rectification is impractical because the separation involves condensation of the hydrogen halide and/or volatile hydrocarbons as reflux in the rectification and this involves high pressures and low temperatures. Separation by rectification is further complicated by the closeness of boiling points of components commonly included in these mixtures and sometimes by the formation of azeotropes of the hydrogen halide and light hydrocarbons which render separation of the hydrogen halide extremely difficult if not impossible. The disadvantages of separation of hydrogen halides by distillation will be even more apparent from the contrast with the present invention in the following portion of the specification. In the selective solvent extraction of hydrogen halides other equally disadvantageous conditions occur. Water, the ideal solvent for hydrogen chloride, for example, is subject to serious disadvantages when the hydrogen chloride must be finally recovered in anhydrous condition. The hydrochloric acid resulting from use of water as solvent is extremely corrosive and involves use of acid resistant materials of construction. Recovery of the hydrogen chloride in the anhydrous state is subject to the further difficulty introduced by the formation of an azeotrope of hydrogen chloride and water. Any anhydrous liquid which may be used as a solvent for the hydrogen halides is much less selective, in that it is much less polar than water. The absorption of hydrogen chloride by use of glacial acetic acid as solvent has been disclosed in the application of K. H. Hachmuth, Serial No. 434,125, filed March 10, 1942, and the selective absorption of hydrogen chloride with an ether has been disclosed by Engs et al., U. S. Patent 2,282,712. These and other solvents useful in selective solvent extraction of anhydrous hydrogen chloride from a mixture thereof with hydrocarbons are expensive and have undesirable characteristics evident to those skilled in the art.

The present invention comprises, broadly, the separation of the contaminants from a hydrogen halide admixed therewith. By contaminants is meant all the other components which may be included in the mixture containing the hydrogen halide. In accordance with this invention the contaminants are selectively absorbed from the gaseous hydrogen halide. I have found that the volatile hydrocarbons in the effluents from a butane-isobutane isomerization reaction, for example, may be absorbed from the gaseous hydrogen chloride by use of a hydrocarbon solvent when used in accordance with my process. This process may be operated at a much lower pressure than is required for a comparable separation by rectification. It will be evident that the absorbent used in my improved process possesses many advantages over those previously used in the separation of hydrogen chloride from hydrocarbons by absorption of the hydrogen chloride. Among the more important practical advantages of the present invention are the relatively low cost of the absorbent, with corresponding low operating costs, and the reduction in the corrosion of equipment as the result of using a relatively non-polar solvent.

An object of this invention is to provide an improved process for the separation of anhydrous hydrogen chloride from admixture with hydrocarbons.

Another object of this invention is to provide an improved method of separating gaseous anhydrous hydrogen chloride from the normally gaseous light hydrocarbons in admixture therewith.

A further object of this invention is to provide such a process in which the hydrocarbons are selectively absorbed from the hydrogen chloride vapors, rather than vice versa as in the prior art.

A still further object of this invention is to provide such a process in which the principle of solution of hydrocarbons in a solvent is applied in the separation of the contaminants, including hydrocarbons, from the hydrogen chloride.

Still another object of this invention is to provide such an improved process which is particularly applicable to the separation of hydrogen chloride from the effluents of a process for the isomerization of butane to isobutane by use of a metal halide catalyst, such as aluminum chloride.

Other objects and advantages of the present invention will be apparent from the following detailed description.

The accompanying drawing illustrates diagrammatically suitable apparatus for carrying out the process of my invention.

With reference to the drawing, which illustrates a specific embodiment of the present invention, the letters are used to designate apparatus for carrying out the catalytic reaction. The apparatus for separation of the hydrogen halide in accordance with this invention is designated by reference numerals. As a specific example, not to be taken as a limiting factor of the applicability of the invention, the following detailed description of the figure is specific to the separation of hydrogen chloride from the effluents of a butane isomerization process. The letter A designates the catalyst chamber or the reactor in which the isomerization of butane to isobutane takes place; B, the aftercooler or condenser; and C, the accumulator which receives condensate from the condenser B in the case of vapor phase reaction or cooled liquid from the aftercooler B in the case of liquid phase reaction.

The hydrocarbon to be reacted, heated to the reaction temperature and in either the liquid or vapor phase depending upon the process, enters the reactor A through line 1 in admixture with hydrogen halide from a suitable source. The effluents from the conversion step pass through the heat dissipator B and are collected in the tank C. The pump 2 delivers the cooled effluent from the tank C to the top plate of the stripping column 3 at a pressure sufficiently higher than the pressure in the reactor A to cause flow of fluid through the system as will be described hereinafter. Sufficient heat is supplied to the base of the stripper 3 by means of the heater 4 to drive off all the hydrogen chloride contained in the solution, together with any hydrocarbon vapors which will leave the stripper in equilibrium with the feed to the stripper. The vapor mixture of hydrocarbons and hydrogen chloride leaving the top of the stripper passes through line 5 to absorber 6, being introduced to the absorber at an intermediate point several plates above the base of the column. In the absorber 6 all, or any desired part, of the hydrocarbons are dissolved in a solvent entering the top of the absorber through the line 7. Heat is supplied to the base of the absorber by the heater 8. Sufficient hydrocarbon vapor, free from hydrogen chloride, may be admitted to the base of the absorber through the pipe 9 to insure complete removal of hydrogen chloride, as will be discussed in more detail hereinafter. The enriched solvent containing the absorbed hydrocarbons flows through the line 10 to the still or fractionating column 11. Heat may be supplied to the fractionator 11 by the heater 12 in the base of the column. The hydrocarbons previously absorbed in the absorber 6 are stripped from the absorbent and pass overhead from the fractionator 11 to the condenser 13, from which condensate and uncondensed vapor is collected in run tank 14. Stripped lean solvent from the base of the fractionator is pumped by the pump 15 through the cooler 16 to the top of the absorber 6, entering through the pipe 7.

The unabsorbed gases from the top of absorber 6 comprising the hydrogen halide, either in pure state or admixed with hydrocarbons or other vapors as desired, pass through the pipe 17 from which they may be removed from the system through line 18 or recycled to the converter through line 19. Any part or all of the hydrogen halide employed in the reaction may be supplied to the reactor by the recycle or from another suitable source through pipe 20. Hydrocarbon liquid, free from hydrogen halide, is withdrawn from the base of the stripper 3 through line 21. The major portion of this liquid is cooled in cooler 22 at a pressure determined by the back pressure regulator 23 which is substantially the operating pressure of the stripper 3. The cooled liquid passing the regulator 23 is passed to an accumulator tank 24. A portion of the hydrocarbon liquid from the base of the stripper 3 is admitted through the valve 26 to the heater 25 where it is vaporized and the resulting vapor is injected through line 9 into the base of absorber 6. The vapor introduced through line 9 to the base of the absorber 6 is sufficient at the temperature maintained by the heater 8 to eliminate the hydrogen halide from the hydrocarbon fluid at the base of the absorber. As will be understood by those skilled in the art, the amount of these hydrocarbon vapors required for desorption of the hydrogen halide is dependent upon the various operating conditions and characteristics of the absorber. The principles of desorption, applied in elimination of the hydrogen halide from the base of the absorber 6, have been previously disclosed and described in more detail in my U. S. Patents 2,249,884 and 2,249,885.

A part of the condensate collected in the run tank 14 is returned as reflux to the top of the fractionator 11 through line 28 by means of the pump 29. Condensate not returned to the fractionator as reflux is drawn from the run tank through the float controlled valve 30 and passes to the accumulator 24 through the line 31. Uncondensed vapors are released from the run tank 14 through the back pressure regulator 32, joining the liquid in line 31 through which it passes to the accumulator 24.

The solvent used in the absorber is preferably a relatively low boiling, normally liquid hydrocarbon. A paraffin hydrocarbon is preferred; normal heptane or its equivalent, an essentially paraffinic hydrocarbon or mixture of hydrocarbons boiling at atmospheric pressure within the range of about 140 to 180° F., has been found very satisfactory as a solvent for the butanes.

The operating conditions for the process of my invention are dependent upon the conversion process. In general, the stripper 3 and absorber 6 are operated at a pressure substantially equal to the conversion pressure, the pressure being raised by the pump 2 above the pressure of the reactor A by an amount sufficient to allow flow of recycled hydrogen halide from the top of the absorber 6 to the reactor A through the pipes 17 and 19. The separation of the absorbed hydrocarbons from the enriched absorbent in the fractionator 11 may be accomplished at a pressure somewhat lower than that of the absorber 6. This pressure must be at a value which will permit condensation of the reflux at a reasonable temperature, the determining factor for the lower pressure limit, and at the same time permit reboiling of the lean absorbent at a reasonable temperature, the determining factor for the upper pressure limit.

My invention is particularly applicable to the separation of hydrogen halide and hydrocarbons from the effluents of a hydrocarbon conversion process, for example an alkylation or isomerization process in which the hydrogen halide is used as a promoter for a metal halide catalyst. However, the process may be applied to separation of a hydrogen halide from one or more hydrocarbons irrespective of the origin of the mixture. The problem of separating a hydrogen halide from hydrocarbons is encountered, for example, in halogenation and dehydrohalogenation, and in other processes, such as those involving a Friedel and Crafts reaction. The present invention is useful in conjunction with any of these processes in which hydrogen halide-hydrocarbon mixtures result and in which it is desirable to maintain the hydrogen halide in anhydrous condition.

*Example*

In the isomerization of butane to isobutane, by passing the butane in vapor form at a temperature of about 210–220° F. and pressure of about 150 lbs. per sq. in. gage, over a catalyst of aluminum chloride in the presence of anhydrous hydrogen chloride, the composition of the effluent is approximately as follows:

| Component | Composition |
|---|---|
| | *Mol per cent* |
| Hydrogen chloride | 7 |
| Propane | 5 |
| Butanes (n. and iso.) | 88 |

The effluent is cooled to a temperature of about 80° F. and collected in the accumulator tank C which is maintained at a pressure in the range of 75 to 150 lbs. per sq. in. The effluent is substantially in the liquid phase at these pressures. The pump 2 raises the pressure of the liquid from the accumulator C to a pressure of about 170 lb. per sq. in., the pressure at which the stripper 3 is operated. In the stripper 3 no attempt is made to segregate any specific component. All of the hydrogen chloride is, however, taken over with the vapors. The base of the stripper 3 is maintained at a temperature of 170° F. At this temperature, the liquid leaving the base of the stripper 3, free from hydrogen chloride, is of such composition that its vapor pressure equals the operating pressure. The hydrocarbon liquid removed from the base of the stripper 3 comprises chiefly butane and isobutane but contains some propane. Obviously a more rigorous separation could be accomplished by increasing the fractionation in this apparatus, but it will be seen that it is unnecessary in many instances to do more than eliminate the hydrogen chloride from the hydrocarbons removed at this point. It will be evident also that this step may be omitted entirely, passing the entire effluent to the absorber 6; however, the separation in stripper 3 of hydrocarbons free of hydrogen chloride from hydrocarbons containing hydrogen chloride serves the useful purpose of reducing the volume of hydrocarbons remaining in admixture with hydrogen chloride to be absorbed in the absorber. A stripper having 15 bubble plates serves to remove a substantial proportion of the hydrocarbons, free from the hydrogen halide. The vapor passing overhead from the stripper 3 is contacted in the absorber 6 with a paraffinic hydrocarbon corresponding approximately to normal heptane. The operating pressure of the absorber 6 is slightly lower than that of the stripper 3 or about 165 lb. per sq. in. The amount of solvent required to absorb the hydrocarbons from the mixture is about 1.5 to 2.5 mols of solvent per mol of vapor entering the absorber. The solvent ratio used depends upon the extent of removal of the most volatile hydrocarbon, in this instance propane, from the hydrogen chloride recycle stream. The system operates satisfactorily with propane included in the recycle vapors. The amount of propane in the recycle stream may conveniently be controlled by adjusting the solvent rate.

In the lower section of the absorber 6, by a combination of heating to about 350° F. and the injection of hydrocarbon vapors containing no hydrogen chloride, the dissolved hydrogen chloride is eliminated from the enriched solvent and the vapor pressure of the enriched absorbent at the base of the absorber 6 is made to equal the operating pressure of 165 lbs. per sq. in. The operating pressure of the fractionator 11 is about 70 lbs. per square inch and the temperature at the base of the fractionator is maintained at about 350° F. The butane is readily removed from the relatively much higher boiling normal heptane solvent. The rectification prevents carryover of the solvent with the butanes removed from the top of the fractionator 11. Since the rectification is relatively readily carried out, only a small reflux ratio is required.

Though it is not essential to the process of my invention, the disposition of vapor and liquid from the run tank 14 is shown, to complete the cycle. In the feed of the example, the partial vapor pressure of hydrocarbons is but 45 to 50 lbs. per sq. in. at 80° F. The vapor pressure of the liquid leaving cooler 22 and passing valve 23 is therefore less than the above value because of the removal of part of the propane. When this propane, together with butane temporarily removed from the stream is returned, the total vapor pressure of the recombined hydrocarbons in accumulator 24 is on the order of 50 lbs. per sq. in. and materials from the run tank 14 therefore feed by their own pressure into it.

The effluents of the isomerization step in the foregoing example were fractionated to separate the hydrogen chloride by rectification. The pressure required for the separation was about 450 lbs. per sq. in. Even at this pressure the separation was incomplete.

The advantages of the process of my invention as compared with rectification are as follows:

1. My process operates at much lower pressure, on the order of 175 lb. per sq. in., as compared with 450 lb. per sq. in. operating pressure required for a much less complete separation by rectification.

2. My process performs the final separation of hydrogen chloride from a relatively small part of the total effluent from the reactor, in which the hydrogen chloride is present in relatively high concentration, instead of separating it from the total effluent from the reactor in which it is present in relatively low concentration.

3. My process is so arranged as not to require the pumping of liquid containing hydrogen chloride through a large pressure differential, and may be accomplished without pumping such liquid at all, and requires, at most, one pump handling liquid containing hydrogen chloride as compared with two or more pumps operating at much higher pressure when a separation is made by rectification.

4. Rectification, even at 450 pounds, and with water cooling, leaves around 30 to 40% propane in the hydrogen chloride while my process, in its first step before separation has really begun, concentrates the hydrogen chloride substantially as much and then completes the separation while handling about 10% of the original mixture instead of the 100% handled by rectification.

5. Rectification, to accomplish separation of hydrogen chloride, would have to operate under conditions which will condense hydrogen chloride as reflux. As it actually operates, with a reflux consisting largely of propane, the attempted separation actually concentrates propane as a contaminant in the hydrogen chloride.

I claim:

1. The process of isomerizing normal butane to isobutane by means of an aluminum chloride catalyst in the presence of anhydrous hydrogen chloride and recycled propane which comprises contacting normal butane with aluminum chloride catalyst in the presence of anhydrous hydrogen chloride and propane under conditions such that isomerization to isobutane takes place, passing the total isomerization effluent in liquid form to the top of a stripping column, operating said stripping column in the absence of any additional reflux and so as to effect only sufficient fractionation therein to eliminate hydrogen chloride from the bottoms fraction, removing from said stripping column an overhead fraction containing substantially all of the hydrogen chloride contained in said effluent in equilibrium with normally gaseous hydrocarbons including propane and butanes and a liquid bottoms fraction comprising chiefly normal butane and isobutane and substantially free from hydrogen chloride, passing said overhead fraction to an absorbing column at an intermediate point therein, introducing to the top of said absorbing column a hydrocarbon solvent consisting essentially of paraffin hydrocarbons boiling so far above butanes as to be readily separable therefrom by fractional distillation and passing said solvent downwardly therein in intimate countercurrent contact with said overhead fraction and thereby causing said solvent to selectively dissolve normally gaseous hydrocarbons from said overhead while allowing the hydrogen chloride and part of the propane to pass through undissolved, removing the undissolved gas comprising anhydrous hydrogen chloride and propane from said absorbing column, controlling the amount of propane in said undissolved gas by adjusting the solvent rate within the range of about 1.5 to about 2.5 mols of solvent per mol of said overhead fraction passed into said absorbing column, and recycling said undissolved gas directly to said isomerization step as a source of propane and anhydrous hydrogen chloride therefor.

2. The process of isomerizing normal butane to isobutane by means of an aluminum chloride catalyst in the presence of anhydrous hydrogen chloride and recycled propane which comprises contacting normal butane with aluminum chloride catalyst in the presence of anhydrous hydrogen chloride and propane under conditions such that isomerization to isobutane takes place, passing the total isomerization effluent in liquid form to the top of a stripping column, operating said stripping column in the absence of any additional reflux and so as to effect only sufficient fractionation therein to eliminate hydrogen chloride from the bottoms fraction, removing from said stripping column an overhead fraction containing substantially all of the hydrogen chloride contained in said effluent in equilibrium with normally gaseous hydrocarbons including propane and butanes and a liquid bottoms fraction comprising chiefly normal butane and isobutane and substantially free from hydrogen chloride, passing said overhead fraction to an absorbing column at an intermediate point therein, introducing to the top of said absorbing column a hydrocarbon solvent consisting essentially of paraffin hydrocarbons boiling so far above butanes as to be readily separable therefrom by fractional distillation and passing said solvent downwardly therein in intimate countercurrent contact with said overhead fraction and thereby causing said solvent to selectively dissolve normally gaseous hydrocarbons from said overhead while allowing the hydrogen chloride and part of the propane to pass through undissolved, removing the undissolved gas comprising anhydrous hydrogen chloride and propane from said absorbing column, controlling the amount of propane in said undissolved gas by adjusting the solvent rate within the range of about 1.5 to about 2.5 mols of solvent per mol of said overhead fraction passed into said absorbing column, recycling said undissolved gas directly to said isomerization step as a source of propane and anhydrous hydrogen chloride therefor, withdrawing as a bottoms product from said absorbing column the said solvent enriched in absorbed hydrocarbons, passing said solvent enriched in absorbed hydrocarbons to a fractionating column and there effecting separation thereof into an overhead fraction of said absorbed hydrocarbons and a bottoms fraction of said solvent in lean form, recycling the so-recovered lean solvent to the top of said absorbing column, and combining said last-named overhead fraction with said liquid bottoms fraction from said stripping column as the net isobutane-normal butane effluent of the isomerization process.

3. A method of treating a mixture essentially comprising a minor but substantial amount of anhydrous hydrogen chloride together with propane, isobutane, and normal butane, to recover a first fraction containing all of said hydrogen chloride in concentrated form and a second fraction containing all of said butanes, which comprises passing such a mixture in liquid form to the top of a stripping column, operating said stripping column in the absence of any additional reflux and so as to effect only sufficient fractionation therein to eliminate hydrogen chloride from the bottoms product, removing from said stripping column a bottoms product comprising butanes and free from hydrogen chloride, removing from the top of said stripping column a gaseous overhead product enriched in hydrogen chloride and also comprising propane and butanes, passing said gaseous product in intimate countercurrent contact with a relatively non-volatile hydrocarbon liquid absorbent and thereby effecting absorption of propane and all of said butanes therefrom while causing the hydrogen chloride to remain undissolved, removing the undissolved gaseous phase comprising the anhydrous hydrogen chloride in concentrated form from the absorbent as said first fraction, removing the enriched absorbent from the absorbing step, distilling the absorbed butanes from the enriched absorbent, and combining so-recovered butanes with said bottoms product to produce said second fraction.

4. A method of treating a mixture essentially comprising a minor but substantial amount of anhydrous hydrogen chloride together with propane, isobutane, and normal butane, to recover a first fraction containing all of said hydrogen chloride in concentrated form and a second fraction containing all of said butanes, which comprises passing such a mixture in liquid form to the top of a stripping column, operating said stripping column in the absence of any additional reflux and so as to effect only sufficient fractionation therein to eliminate hydrogen chloride from the bottoms product, removing from said stripping column a bottoms product comprising butanes and free from hydrogen chloride, removing from the top of said stripping column a gaseous overhead product enriched in hydrogen chloride and also comprising propane and butanes, passing said gaseous product in intimate countercurrent contact with a relatively non-volatile hydrocarbon liquid absorbent and thereby effecting absorption of propane and all of said butanes therefrom while causing the hydrogen chloride to remain undissolved, vaporizing a portion of said bottoms product and passing same through the enriched absorbent to completely eliminate hydrogen chloride from the enriched absorbent, removing the undissolved gaseous phase comprising the anhydrous hydrogen chloride in concentrated form from the absorbent as said first fraction, removing the thus-treated enriched absorbent from the absorbing step, distilling the absorbed butanes from the enriched absorbent, and combining so-recovered butanes with the remainder of said bottoms product to produce said second fraction.

5. The method of claim 3, in which said absorbent essentially comprises normal heptane.

SAMUEL C. CARNEY.

REFERENCES CITED

The following references are of record in the file of this patent:

UNITED STATES PATENTS

| Number | Name | Date |
| --- | --- | --- |
| 2,271,866 | Liston | Feb. 3, 1942 |
| 1,363,487 | Taber | Dec. 28, 1920 |
| 1,817,667 | Blau | Aug. 4, 1931 |
| 2,300,235 | Pines et al. | Oct. 27, 1942 |
| 2,353,950 | Wenzke | July 18, 1944 |
| 2,355,446 | Komarewsky et al. | Aug. 8, 1944 |
| 2,344,789 | Schmerling | Mar. 21, 1944 |
| 2,326,627 | Egloff et al. | Aug. 10, 1943 |
| 1,422,183 | Curme, Jr. | July 11, 1922 |
| 2,264,878 | Hatch | Dec. 2, 1941 |
| 2,282,712 | Engs | May 12, 1942 |
| 2,310,523 | Groll | Feb. 9, 1943 |
| 2,266,011 | d'Ouville et al. | Dec. 16, 1941 |
| 2,374,476 | Evans et al. | Apr. 28, 1942 |

FOREIGN PATENTS

| Number | Country | Date |
| --- | --- | --- |
| 16,910 | British | Of 1906 |
| 16,910A | British | Of 1906 |